United States Patent [19]

Cole et al.

[11] Patent Number: 4,986,609

[45] Date of Patent: Jan. 22, 1991

[54] LOAD SENSING PROPORTIONING VALVE FOR BRAKE SYSTEM

[75] Inventors: Joe S. Cole, Mesquite; Neil B. Christopher, Arlington, both of Tex.

[73] Assignee: Surfaces, Inc., Carrollton, Tex.

[21] Appl. No.: 776,447

[22] Filed: Sep. 16, 1985

[51] Int. Cl.⁵ ............................................. B60T 8/30
[52] U.S. Cl. ................................... 303/9.69; 303/22.5
[58] Field of Search ............... 188/272; 303/6 C, 6 R, 303/22 A, 9.69, 22.5

[56] References Cited

U.S. PATENT DOCUMENTS

| | | |
|---|---|---|
| 2,933,048 | 4/1960 | Bock . |
| 3,122,265 | 3/1965 | Randol . |
| 3,169,800 | 2/1965 | Oberthur .......................... 303/22 A |
| 3,171,333 | 3/1965 | Mandy . |
| 3,525,554 | 8/1970 | Oberthur .......................... 303/22 A |
| 3,712,684 | 1/1973 | Cordiano .......................... 303/22 A |

FOREIGN PATENT DOCUMENTS

| | | | |
|---|---|---|---|
| 547385 | 10/1957 | Canada .............................. 303/22 A |
| 1288940 | 2/1962 | France .............................. 303/22 A |

*Primary Examiner*—Duane A. Reger
*Attorney, Agent, or Firm*—Fleit, Jacobson, Cohn, Price, Holman & Stern

[57] ABSTRACT

A load sensing proportioning valve system for the hydraulic brake system of passenger cars and the like for varying the amount of brake fluid pressure and thus the braking torque at the rear brakes of a passenger car. The system includes a load sensor oriented between a suspension component, such as a supporting spring, and the vehicle frame or body and includes a cavity for incompressible fluid in which variation in load will vary the volume of the cavity for providing increased pressure and volumeric flow of an incompressible fluid from the cavity to a proportioning valve incorporated into the hydraulic brake lines extending from the master cylinder to the rear brakes of a passenger car for regulating the proprotioning valve to vary the braking pressure and thus braking torque to the rear wheels to reduce or eliminate premature rear wheel locking when applying brakes of a lightly loaded vehicle and to maintain adequate braking force for the same vehicle when heavily loaded. A flexible line interconnects the load sensor and the proportioning valve to compensate for relative movement between the vehicle frame and suspension system and the proportioning valve includes an actuator in the form of a actuating piston engageable with the proportioning piston in the proportioning valve to regulate the movement of the proportioning piston and thus regulate the proportioning valve in response to variations in load applied to the rear suspension components of the vehicle.

3 Claims, 2 Drawing Sheets

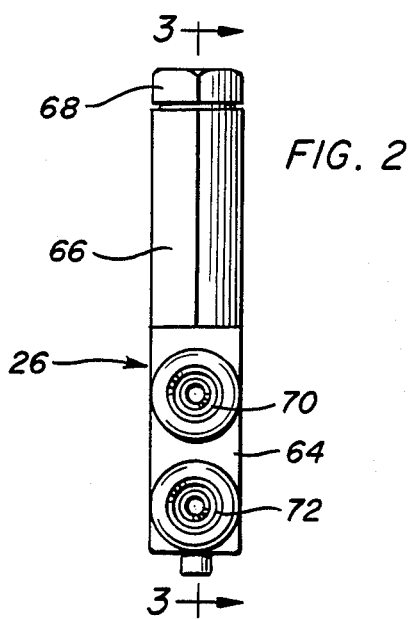
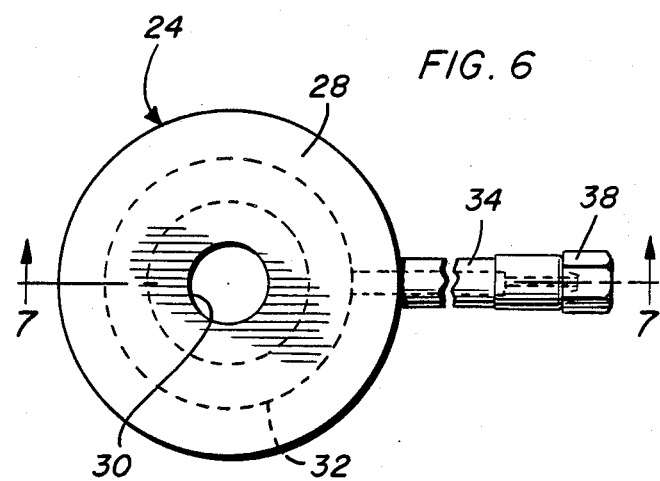
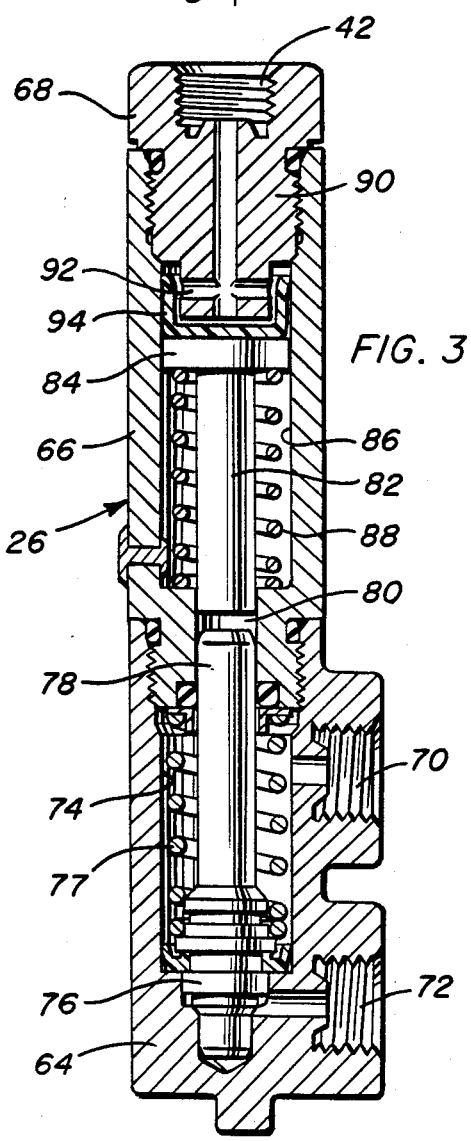
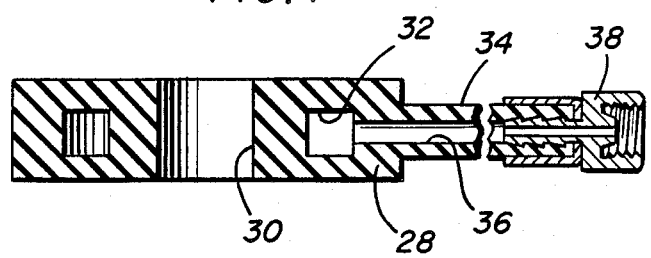
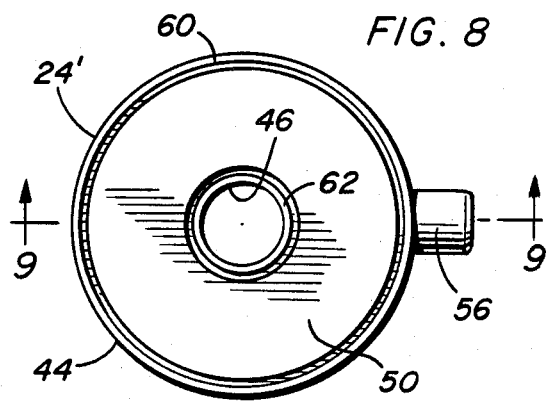
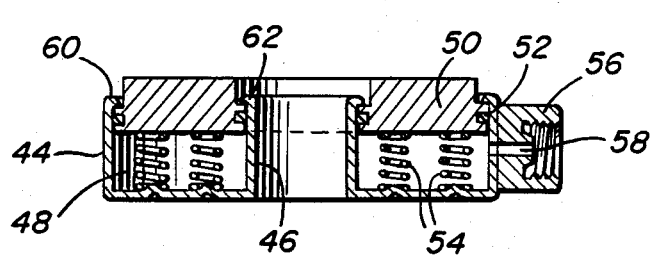

LOAD SENSING PROPORTIONING VALVE FOR BRAKE SYSTEM

BACKGROUND OF THE INVENTION

1. Field of the Invention

The present invention relates to a proportioning valve system in the hydraulic brake system of a vehicle which includes a fixed ratio proportioning valve and a load sensor which enables the weight over the rear wheels to be measured for modifying the braking pressure applied to the front and rear wheel brakes in response to the load over the rear wheels.

2. Information Disclosure Statement

In the development of braking systems for passenger cars, many efforts have been made to modify the pressure available at the rear brakes upon depression of the brake pedal. The efforts to modify the braking pressure available at the rear brakes includes fixed ratio proportioning valves as well as height sensing valves in which the pressure is modified according to the height of the vehicle. The fixed ratio proportioning valves are somewhat limited in their application because of the variability in weight distribution of many passenger cars which causes excessive trade offs in the compromise to determine the best ratio. The height sensing valves attempt to remedy this problem but the system costs increase due to the necessary adjustments that are required at installation with these adjustments also being susceptible to inaccuracies and poor workmanship. The following U.S. patents disclose some of the attempts to modify the brake pressure available at the rear brakes of a passenger car or the like.

| | |
|---|---|
| 3,162,491 | Dec. 22, 1964 |
| 3,463,556 | Aug. 26, 1969 |
| 4,062,597 | Dec. 13, 1977 |
| 4,150,855 | April 24, 1979 |
| 4,325,581 | April 20, 1982 |
| 4,453,779 | June 12, 1984 |

SUMMARY OF THE INVENTION

An object of the present invention is to provide a load sensing proportioning valve system for the brake system of a passenger car which includes a load sensor, a flexible line, a fixed ratio proportioning valve and an actuator responsive to the load sensor with the system allowing the weight over the rear wheels of the passenger car to be measured so that the brake pressure supplied to the rear wheels can be modified in response to a true value of weight over the rear wheels without the introduction of inaccuracies of a height sensing system.

Another object of the invention is to provide a load sensing proportioning valve system in accordance with the preceding object in which the load sensor is positioned in the suspension system of the vehicle for supporting its share of the vehicle load with the load sensor being mounted between the supporting springs and the frame of a vehicle so that it will deflect in proportion to the applied load thereby decreasing the volume of an internal cavity and causing a relatively incompressible fluid to move through a flexible line to an actuator which acts on a fixed ratio proportioning valve.

A further object of the invention is to provide a load sensing proportioning valve system in accordance with the preceding objects in which the incompressible fluid displaced from the load sensor will act on a piston which contacts the proportioning piston of the fixed ratio proportioning valve with the flexible line between the load sensor and the actuator accommodating relative motion between the load sensor in the suspension system and the vehicle body or frame.

Still another object of the invention is to provide a load sensing proportioning valve system for passenger car brakes or the like which involves a minimum number of parts to maintain the system costs as low as possible and yet provide a dependable, accurate and easily installed and maintained system.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an elevational view of the load sensing proportioning valve.

FIG. 3 is a longitudinal, sectional view of the proportioning valve, on an enlarged scale, taken along sectional line 3—3 on FIG. 2.

FIG. 6 is a plan view of one embodiment of the load sensor forming a component of this invention.

FIG. 7 is a vertical sectional view of the load sensor taken along section line 7—7 on FIG. 6.

FIG. 8 is a plan view of another embodiment of the load sensor.

FIG. 9 is a vertical sectional view taken along section line 9—9 on FIG. 8.

DESCRIPTION OF THE PREFERRED EMBODIMENTS

Figure 1:
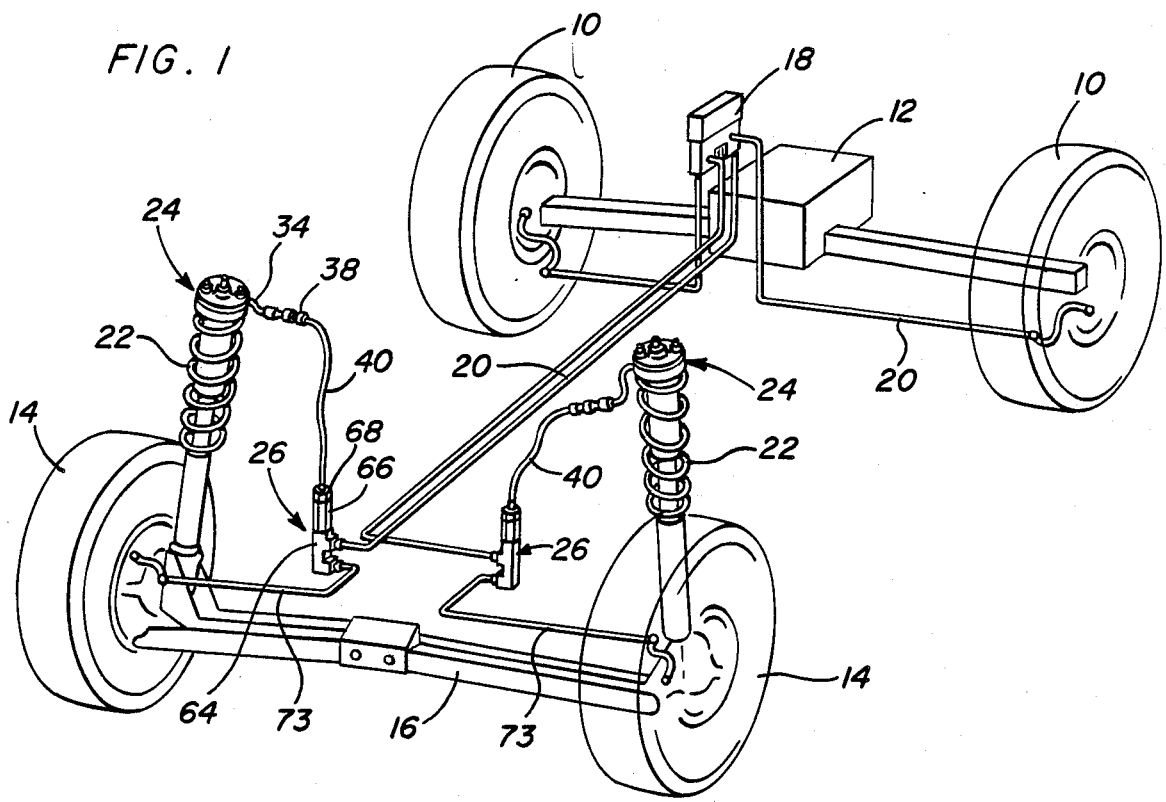
FIG. 1 is a schematic perspective view illustrating the load sensing proportioning valve system of the present invention associated with the hydraulic brake system of a passenger car.

Referring to the drawings, the load sensing proportioning valve system of the present invention is illustrated schematically in FIG. 1 with a passenger car braking system including front wheels 10, a front wheel drive unit 12, rear wheels 14, an axle assembly 16 extending between the rear wheels 14 and connected to the vehicle frame or body in any suitable manner for relative movement in relation thereto. A fluid level sensing master cylinder 18 is positioned forwardly in the vehicle and is operatively connected to the brake pedal (not shown) in a conventional and well known manner with the master cylinder 18 including hydraulic lines 20 extending to the wheel brakes in a conventional manner with the brake system illustrated being split diagonally with the left front and right rear brakes and the right front and left rear brakes being interconnected. As schematically illustrated, the rear wheels 14 are provided with load carrying springs 22 which may include a shock absorber internally thereof for supporting the vehicle frame and body from the rear axle assembly 16 and rear wheels 14 in a conventional manner. The load sensor 24 forming part of the present invention is interposed between the upper end of the spring 22 and the vehicle frame or body (not shown) so that in effect, the load sensor 24 becomes a load sensing suspension component interposed between the sprung weight and components and the unsprung components with the load sensor 24 being movable in relation to the wheels 14 having the brake actuating cylinders incorporated therein. As illustrated in FIG. 1, each of the hydraulic pressure lines 20 extending to the rear wheels 14 has a load sensitive proportioning valve 26 incorporated therein.

As illustrated in FIGS. 6 and 7, the load sensor 24 includes an annular body 28 of resilient material having a central opening 30 to facilitate its mounting on the upper end of the supporting spring and related structure 22 and an annular closed cavity 32 filled with incompressible fluid so that when load forces are exerted on the top and bottom surfaces of the body 28, the cavity 32 will decrease in volume thereby increasing the pressure of the incompressible fluid in the cavity 32. The body includes a radially extending tubular member 34 having a flow passageway 36 extending therethrough and communicating with the cavity 32 with a swivel fitting 38 being provided on the end of the tubular member 34 for connection with a flexible line 40 which extends to and communicates with the upper end of the proportioning valve 26 with the flexible line 40 being connected to an inlet 42 at the upper end of the proportioning valve 26.

FIGS. 8 and 9 illustrate another embodiment of the load sensor 24' which includes a rigid cylinder 44 having a central annular tubular member 46 forming an opening through the sensor 24' for mounting on the upper end of the load supporting springs 22 and related structure. Thus, an annular cavity 48 is formed with the upper end thereof being closed by a load bearing piston 50 which is of annular configuration and slidable in the cavity 48 with an O-ring seal 52 around the inner and outer peripheries of the load bearing piston 50 as illustrated in FIG. 9. A plurality of coil springs 54 are interposed between the inner end of the piston 50 and the upper surface of the cylinder 44 with suitable anchor means securing the springs in place to bias the piston 50 upwardly. A radial swivel fitting 56 is connected to the cylinder 44 and is provided with a passageway 58 which communicates the cavity 48 having incompressible fluid therein with the flexible line such as the line 40 extending to the proportioning valve 26 so that upon increase in weight being exerted on the load bearing piston 50, the piston 50 will move downwardly thus increasing the pressure in the incompressible fluid which is caused to move through the line 40 into the inlet of the proportioning valve 26. As illustrated, the cylindrical member and the tubular member 46 have inwardly and outwardly flared flanges 60 thereon to overlie and capture the inner end portion of the piston 50 which has a shoulder 62 formed thereon which faces upwardly to engage with the flanges 60 to retain the piston in assembled relation when no load is exerted thereon.

The structure of the proportioning valve 26 is illustrated in FIGS. 2 and 3 and includes a lower body 64 and an upper body 66 connected thereto and an upper closure member 68 connected to the upper body 66 and having the screw threaded inlet 42 formed therein with the components of the proportioning valve being screw threadedly connected and provided with O-ring seals. The lower body 64 includes an inlet 70 having the line 20 communicated therewith from the master cylinder 18 and an outlet 72 having a line 73 communicated therewith which extends to the brake cylinder within the respective rear wheel assemblies 14. The interior of the lower body 64 is provided with a cylindrical bore 74 and a movable proportioning piston 76 engaged by a spring 77 to bias it downwardly to control the flow from the inlet 70 to the outlet 72 depending upon the longitudinal position of the piston 76 in the lower body 64. The upper end or stem 78 of the piston 76 is slidably guided by a bore 80 in the lower end of the upper body 66 in opposed relation and in spaced relation to the stem 82 of the actuating piston 84 that is reciprocally mounted in a bore 86 in the upper body 66 with the lower end of the stem also being guided by the bore 80. A compression coil spring 88 extends between the actuating piston 84 and the lower end of the bore 86. The inlet fitting 68 is provided with a longitudinal passageway 90 communicating with the inlet 42 and communicating with longitudinal and radial discharge passageways 92 communicating with the interior of the bore upwardly of a cup-shaped seal 94 engaged with the actuating piston whereby increase in pressure in the inlet 42 and passageways 90 and 92 will move the cup-shaped seal 94 downwardly along with the actuating piston 84 against the compression spring 88 for regulating the movement of the proportioning piston 76 for controlling pressure supplied to the wheel brakes through the inlet 70 and outlet 72 past the proportioning piston 76.

Figure 4:
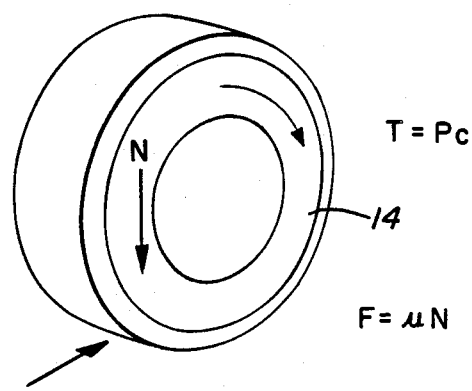
FIG. 4 is a diagrammatic illustration of the braking force on a wheel.

FIG. 4 schematically illustrates a simplified arrangement in which the braking capability is a function of the coefficient of friction, the normal force on the wheel and the braking torque which is assumed to be directly proportional to brake line pressure. The normal force (weight) on the wheel is being measured by the load sensor 24 and variations in the coefficient of friction (road conditions) are assumed to be monitored by the driver. With these assumptions and the present invention, a load sensitive proportioning valve is a most cost effective solution to the problem of controlling premature wheel locking due to excessive braking torque with light loads while maintaining adequate stopping distances with heavy loads.

Figure 5:
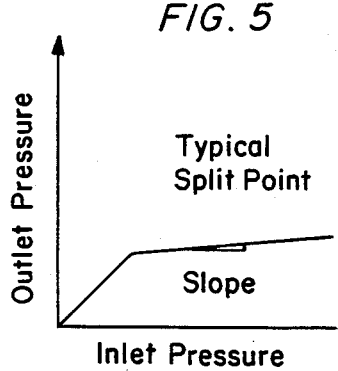
FIGS. 5 and 5a are diagrammatic graphs illustrating a typical proportioning valve split point and the variable split point.
Figure 5A:
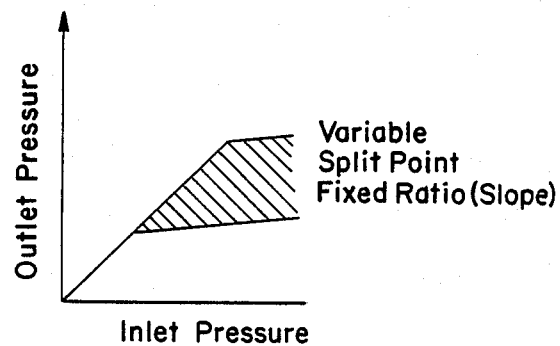

The load sensor provides a resilient action either from the resilent body or the springs under the load bearing piston and the load sensor will be capable of supporting its proportion of the vehicle load. As illustrated, it could be mounted between the supporting springs and the frame of a vehicle and the resilient device will deflect in proportion to the applied load. The deflection of the resilient device will decrease the volume of the internal cavity which causes a relatively incompressible fluid to flow through the flexible line 40 which is sufficiently flexible to compensate for relative motion between the load sensor, a component of the suspension, and the vehicle body or frame. The connectors 38 or 56 allow the flexible line to be positioned in the proper orientation after connecting to the proportioning valve 26. If necessary, swivel fittings or conventional fittings may be employed in the flexible line 40. The flexible line is connected to the inlet 42 at the upper end of the proportioning valve 46 with the incompressible fluid acting on the actuator piston 84 which acts on the fixed ratio proportioning piston 76. Thus, the fluid which was displaced from the load sensor will act on the piston 84 which contacts the proportioning piston 76. Under initial static conditions with the vehicle lightly loaded and no dynamic forces involved, there will be slack in the system and the actuator piston 84 will not exert any force on the proportioning piston 76 since the resilient device or load sensor will be supporting the load and no pressure will be exerted on the incompressible fluid. As the weight is increased, pressure on the incompressible fluid will increase and exert a force on the actuating piston 84 which will modify the "split point", as illustrated in FIGS. 5 and 5a, of the fixed ratio valve in proportioning to the load forces on the load sensor. FIG. 5 illustrates the typical "split point" and FIG. 5a illustrates the variable "split point" both of which have a fixed ratio or slope but the "split point" in FIG. 5a is variable due to action of the actuating piston on the proportioning piston. In addition to improved braking, load sensor 24 or 24' may also replace existing coil spring cushions. Also, the invention may be adapted for use with leaf spring suspension assemblies by altering the configuration of the load sensors.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with the hydraulic brake system of a vehicle having a master cylinder operatively associated with a brake pedal for supplying pressurized hydraulic fluid to rear wheel brakes through independent pressure lines, means regulating braking pressure supplied to the rear wheel brakes of the vehicle proportional to the weight supported by the rear wheels to reduce or eliminate premature rear wheel locking when applying the brakes on a lightly loaded vehicle and to maintain adequate breaking force for the same vehicle heavily loaded, said means comprising a pair of load sensing devices with a load sensing device interposed between the rear suspension system for each rear wheel and each side of the vehicle frame, each load sensing device providing a supply of incompressible fluid at a pressure proportional to the weight supported by the load sensing device, a load proportioning valve in each independent pressure line between the master cylinder and each rear wheel brake, each proportioning valve including an actuating means, means communicating the supply of pressurized incompressible fluid provided by the load sensing device at one side of the frame to the actuating means included in the proportioning valve in the pressure line to the rear wheel brake at the same side of the frame, said actuating means being responsive to incompressible fluid pressure for regulating the movement of each proportioning valve to independently vary the braking pressure supplied to the respective rear wheel brakes, thereby independently varying the braking torque exerted on each of the rear wheels in response to variation in load on each of the rear wheels.

2. The combination as defined in claim 1 wherein each load sensing device includes a hollow body defining a cavity receiving incompressible fluid, said body being of one piece, unitary construction of resilient material with the resiliency of the body forming means for returning the movable portion of the body to its original position, said body and cavity being of annular configuration with said body including an opening extending therethrough isolated from the cavity to enable the body to be supported between a suspension element for a rear wheel of a vehicle and a vehicle frame, said cavity being communicated with a proportioning valve in the pressure line to the rear wheel brake on the same side of the frame for regulating the proportioning valve in response to change in the volume of the cavity upon variation in the load applied to the body.

3. The combination as defined in claim 1 wherein each load sensing device includes a hollow body defining a cavity receiving incompressible fluid, said body being a rigid cylindrical member having a movable load bearing piston telescoped into one end thereof, means biasing the piston to return the cavity to normal volume, said biasing means including a plurality of compression springs interposed between the piston and cylindrical member to bias the piston outwardly of the cylindrical member to return the cavity to normal volume, said cylindrical member and piston being of annular configuration and provided with an opening extending therethrough isolated from the cavity to enable the body to be supported between a suspension element for a rear wheel of a vehicle and a vehicle frame whereby load exerted by the vehicle frame will move the piston inwardly to reduce the volume of the cavity, said cavity being communicated with the proportioning valve in the pressure line to the rear wheel brake on the same side of the frame for regulating the proportioning valve in response to change in volume of the cavity upon variation in the load applied to the body.

* * * * *